(12) United States Patent
Raith (10) Patent No.: US 8,406,211 B2
(45) Date of Patent: Mar. 26, 2013

(54) FORWARD ERROR CORRECTION FOR BROADCAST/MULTICAST SERVICE

(75) Inventor: Alex Krister Raith, San Diego, CA (US)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 1176 days.

(21) Appl. No.: 11/236,996

(22) Filed: Sep. 28, 2005

(65) Prior Publication Data

US 2006/0072538 A1 Apr. 6, 2006

Related U.S. Application Data

(60) Provisional application No. 60/614,408, filed on Sep. 29, 2004.

(51) Int. Cl.
*H04J 3/24* (2006.01)
(52) U.S. Cl. ........ 370/349; 370/469; 370/474; 370/476; 714/746; 714/758; 714/752; 714/780; 714/776; 714/784; 714/786
(58) Field of Classification Search .................. 714/746, 714/758, 752, 776, 780, 784, 755, 786; 370/469, 370/474, 476
See application file for complete search history.

(56) References Cited

U.S. PATENT DOCUMENTS

| | | | | |
|---|---|---|---|---|
| 5,883,893 | A * | 3/1999 | Rumer et al. | 370/395.6 |
| 6,850,519 | B1 * | 2/2005 | Saito et al. | 370/389 |
| 6,944,802 | B2 * | 9/2005 | Park et al. | 714/701 |
| 7,451,381 | B2 * | 11/2008 | Miller et al. | 714/774 |
| 2004/0037246 | A1 * | 2/2004 | Grilli et al. | 370/331 |
| 2004/0170121 | A1 * | 9/2004 | Kim et al. | 370/208 |
| 2005/0041745 | A1 * | 2/2005 | Zhang et al. | 375/240.27 |
| 2005/0207350 | A1 * | 9/2005 | Bloebaum | 370/252 |
| 2006/0023732 | A1 * | 2/2006 | Vedantham et al. | 370/432 |

FOREIGN PATENT DOCUMENTS

WO   WO 03/063385   7/2003

OTHER PUBLICATIONS

H. Jenkač, T. Stockhammer, and W. Xu, "Permeable-Layer Receiver for Reliable Multicast Transmission in Wireless Systems," IEEE Communications Society/WCNC 2005, pp. 1805-1811.

* cited by examiner

*Primary Examiner* — Wayne Cai
*Assistant Examiner* — Shantell L Heiber
(74) *Attorney, Agent, or Firm* — Coats & Bennett, P.L.L.C.

(57) ABSTRACT

An error detection unit performs erasure decoding for physical layer packets and an assembler assembles the received data into higher layer packets. Higher layer packets that are incomplete are not erased if the higher layer packets contain some data indicated as valid by the error detection unit. In the case of incomplete packets, the data is labeled by assigning a value to a reliability attribute for the data to enable the decoder to discriminate between valid and invalid data in the same packet. The decoder is modified to use "dimmed" data from the incomplete packets to perform decoding.

23 Claims, 9 Drawing Sheets

FORWARD ERROR CORRECTION FOR BROADCAST/MULTICAST SERVICE

RELATED APPLICATION

This application claims the benefit of U.S. Provisional Patent Application No. 60/614,408 that was filed on Sep. 29, 2004, which is incorporated herein by reference

BACKGROUND

The present invention relates generally to error coding for mobile communication networks and, more particularly, to packet-level forward error correcting codes for broadcast/multicast services and other services.

High data rate multimedia applications, such as video streaming, audio streaming, and download services, long available in wired networks, are now being offered over mobile communications networks. Various standard organizations, such as the 3rd Generation Partnership Project (3GPP) and the 3rd Generation Partnership Project 2 (3GPP2) are developing standards for broadcast and multicast services. Broadcast and multicast services are both forms of point-to-multipoint (PTM) communications where data packets are simultaneously transmitted from a single source to multiple users over a common channel. A distinction is sometimes drawn between broadcast and multicast services. The distinction is that a broadcast stream is typically offered to all users, while a multicast stream is offered to a special multicast group. Broadcast and multicast services are referred to herein collectively as mobile broadcast services. In GSM/WCDMA systems, broadcast/multicast services are referred to as Multimedia Broadcast and Multicast Services (MBMS). In cdma2000, broadcast/multicast services are called Broadcast and Multicast Services (BCMCS).

Reliable delivery of data is one of the key requirements for mobile broadcast services. Because broadcast and multicast are one way transmissions in the downlink, the transmission control protocol (TCP) cannot be employed to ensure reliable delivery. The Internet Engineering Task Force (IETF) has proposed a framework for data delivery from a media server to the radio access networks (RANs) over unicast channels called File Delivery Over Unidirectional Transport (FLUTE). FLUTE employs the User Datagram Protocol (UDP) as its underlying transport protocol. However, because UDP is unreliable, FLUTE can support packet-level forward error correction (FEC) at the application layer to protect encapsulated data against occasional packet loss. At the RAN, the FLUTE packets are segmented and encapsulated into physical layer packets for transmission over the air interface. One or more intermediate protocol layers may exist between the application layer and the physical layer. Even with strong FEC coding, some packet loss at the physical layer is to be expected due to the harsh conditions of the radio channel.

In most applications using mobile broadcast services, an application layer packet is discarded if any portion of the application packet is lost. Because physical layer packets are typically not aligned with application layer packets, the loss of a single physical layer packet may result in the loss of two or more application layer packets. This effect is referred to as error propagation. Reducing the segmentation ratio, defined herein as the ratio of application layer packet length to physical layer packet length, will result in lower packet loss rate for application packets at the expense of greater header overhead. On the other hand, increasing the size of the application layer packets will reduce header overhead but will increase the packet loss rate of the application layer packets. The packet loss rate can be reduced by decreasing the code rate of the FEC codes used at the application layer. However, reducing the code rate means that the number of redundant bits transmitted increases and, hence, the system throughput decreases.

SUMMARY

The present invention relates to a method of encoding and decoding packet data delivered as part of a broadcast/multicast service. At the transmitter, a source object is divided into a source block. The source block is then encoded using a forward error correcting code, such as a Reed Solomon code, Raptor code or LPCD code. The coded data is then inserted into application layer packets for transmission to one or more radio access networks (RANs) in the broadcast service area. At each RAN, the application layer packets are segmented and encapsulated into physical layer packets for transmission over the air interface to a plurality of mobile terminals.

The mobile terminals receive the physical layer packets over the air interface, some of which will be corrupted. Valid physical layer packets are determined by an error detection unit at the receiver based on CRC bits contained in the physical layer packet. Invalid packets are erased. The coded packet data contained in valid physical layer packets is decapsulated and re-assembled into application layer packets. Due to erasure of some of the physical layer packets, some application layer packets will be entirely missing, while other application layer packets will be incomplete. According to the present invention, the incomplete or partial application layer packets are not erased but instead are forwarded to the application layer along with all complete application layer packets. The data contained in the partial application layer packets is labeled by assigning a value to a reliability attribute of the data to allow the decoder to discriminate between invalid data and valid data contained in partial application layer packets. In one embodiment, valid data in partial application layer packets may be labeled as dimmed. During decoding, the decoder may use the "dimmed" data from the partial application layer packets. Making the "dimmed" data contained in partial application layer packets available to the decoder mitigates the error propagation effect so that packet length of application packets can be increased without significantly impacting the error rate. Increasing the packet length of the application layer packets, in turn, increases channel capacity because the relative size of the header is significantly reduced.

DETAILED DESCRIPTION

Figure 1:
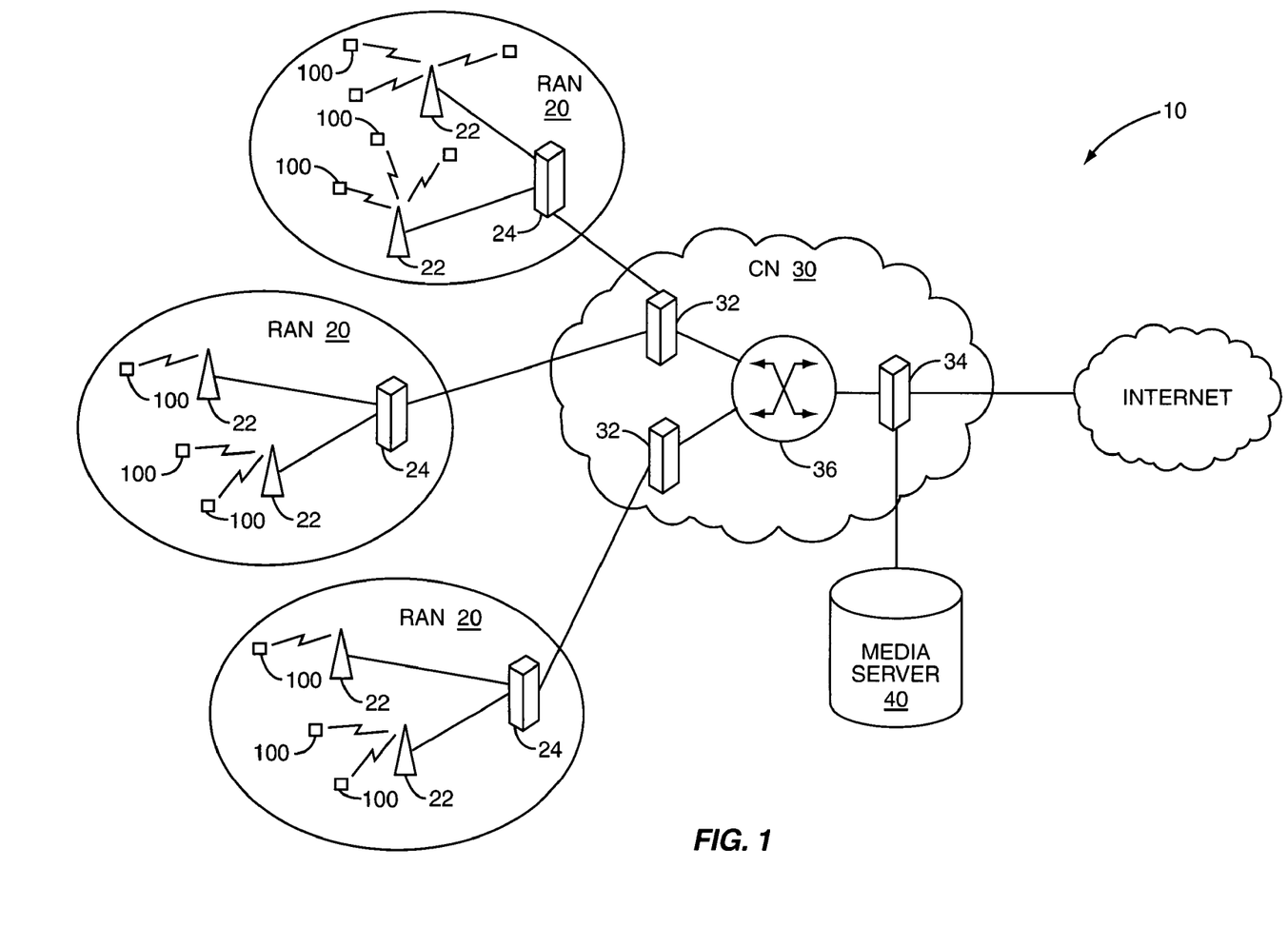
FIG. 1 illustrates an exemplary mobile communication network.

Referring now to the drawings, FIG. 1 illustrates an exemplary mobile communication network for providing broadcast and multicast services to mobile terminals 100. The term mobile broadcast service is used herein as a generic name for both broadcast and multicast service. The network architecture shown in FIG. 1 is based on the network architecture standardized by the 3rd Generation Partnership Project (3GPP) generally known as the UMTS architecture. Those skilled in the art will recognize that other network architectures may also be employed. For example, the network architecture standardized by the 3rd Generation Partnership Project 2 (3GPP2) generally known as cdma2000 could also be employed. The present invention may also be used in networks based on the IEEE 802.16 standard, commonly known as WiMax.

There are three main elements in the network 10: the radio access network (RAN) 20, the core network 30, and the media server 40. The radio access networks 20 communicate with the mobile terminals 100 and provide the mobile terminals 100 with access to the network 10. The core network 30 provides connections to external networks, such as the Internet, and other public LAN mobile networks. The media server 40, which is shown separately but may be a part of the core network 30, is responsible for providing and delivering mobile broadcast services. The media server 40 also serves as an entry point for content providers that want to deliver content to mobile terminals 100 using the mobile broadcast service. The media server 40 sets up and controls transport bearers to the core network 30 for mobile broadcast services, schedules broadcasts, and delivers broadcast media content. The media server 40 also provides service announcements to mobile terminals 100. These announcements contain the necessary information needed by the mobile terminal 100 to join an MBMS service.

The RAN functionality is divided into two network elements referred to in the UMTS standard as Node B 22 and the radio network controller (RNC) 24. A Node B 22 is a radio base station (RBS) that contains the radio equipment for communicating with the mobile terminals 100. The RNC 24 manages the radio resources and provides connection to the core network 30. The functions performed by the RNC 24 include allocating radio resources, terminating air interface layer 2 and layer 3 protocols, diversity combining, scheduling, power control, etc. A single RNC 24 may provide control functions for multiple Node Bs 22. A single Node B 22 and RNC 24 is referred to as a base station. Those skilled in the art will appreciate that a single RNC 24 may form the control part of multiple base stations.

The core network 30 comprises one or more serving GPRS support nodes (SGSNs) 32 and at least one gateway GPRS support node (GGSN) 34. The SGSN 32 is responsible for most session management, QoS management, mobility management, and authentication functions. The GGSN 34 serves as a gateway between the core network 30 and external IP networks. The SGSNs and GGSNs are connected by an IP backbone network 36.

Figure 2:
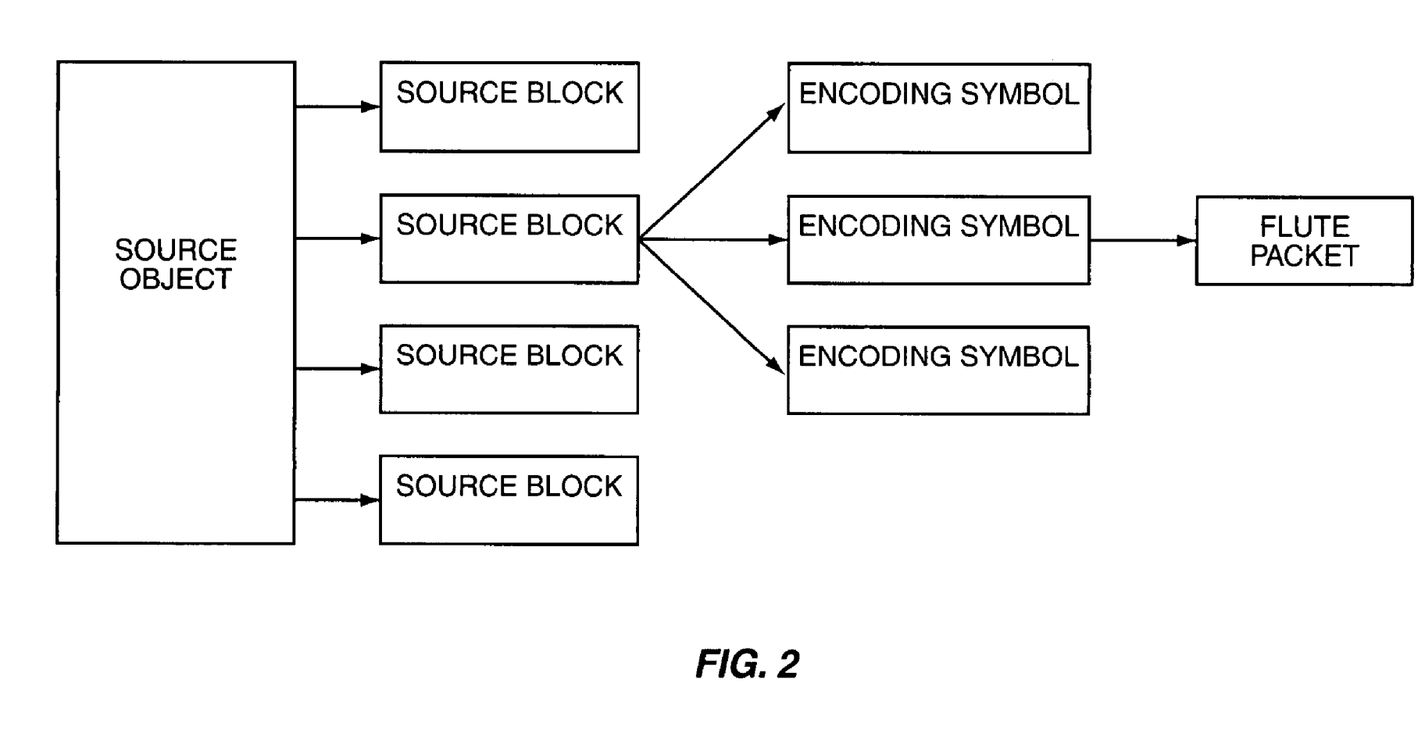
FIG. 2 illustrates exemplary FEC encoding and formatting of media content for delivery through the mobile communication network to radio access networks in the broadcast service area.

FIG. 2 illustrates how multimedia content is packetized by the media server 40 for delivery over the network 10 to one or more mobile terminals 100. A source object, such as a video clip, is divided into source blocks of size suitable for packet-level forward error correction (FEC) coding. A packet-level code is a code that converts k data packets into n>k coded packets. In the case of Reed Soloman codes, receipt of any k coded packets correctly enables the original k data packets to be reconstructed. For other codes, more than k coded packets may be needed. The encoding process will generate a plurality of encoding symbols from each source block. The encoding symbols output by the FEC encoder are inserted into application layer packets for transport over the network to each RAN in the coverage area for the MBMS service. In the exemplary embodiment, the protocol for delivering the source data is the FLUTE protocol, which stands for File Delivery Over Unreliable Transport. Each FLUTE packet includes a header of approximately 44 bytes, which comprises FLUTE specific information (16 bytes), a UDP header (8 bytes), and an IP header (20 bytes) as well-known to those skilled in the art. Other protocols can also be used to transport the application data.

Figure 3:
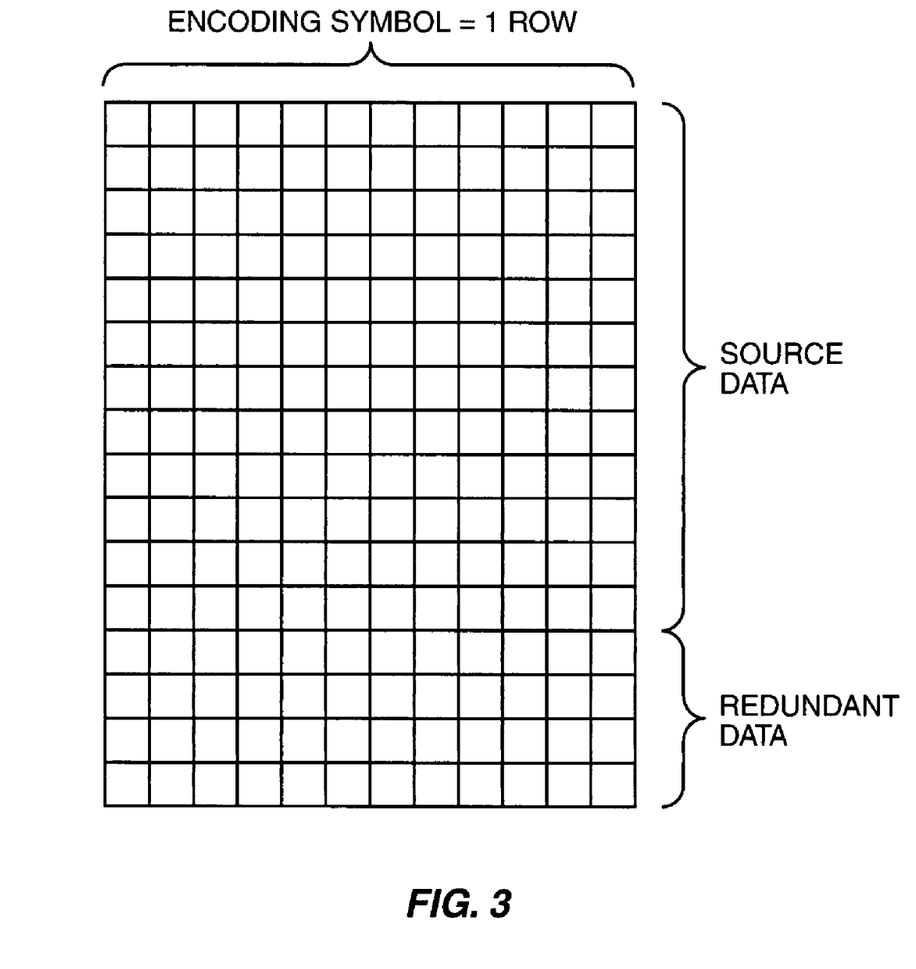
FIG. 3 illustrates exemplary FEC coding for media content.

FIG. 3 illustrates one exemplary method of encoding source blocks. The source data in each source block is arranged in a matrix. Each element of the matrix comprises one octet. Data is read into the matrix row by row. After the source data is input to the matrix, the FEC encoder systematically encodes the data along each column and appends additional rows to the matrix to contain the redundant data generated by the FEC encoding. The FEC encoder may, for example, apply a linear block code such as a Reed Solomon code. After encoding, the data is read out row by row. Each row may comprise one or more encoding symbols. As previously noted, the encoding symbols are then inserted into application layer packets, such as FLUTE packets, for delivery over the network.

Figure 4:
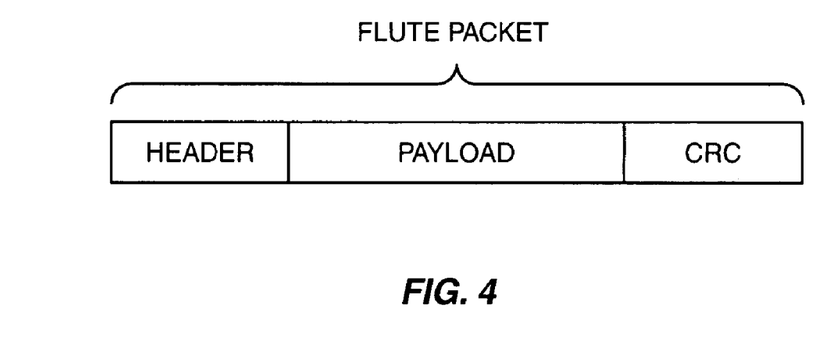
FIG. 4 illustrates an exemplary application layer packet for transporting media content through the mobile communication network a network.

An exemplary FLUTE packet is shown in FIG. 4. Each FLUTE packet includes a header, a payload, and a CRC. In one embodiment, the payload of each FLUTE packet comprises one or more encoding symbols, e.g. one row of the source block. In some embodiments of the invention, the CRC may be generated over the header and payload. In other embodiments, the CRC may be generated on the header only. Also, the packet may include two CRCs, one generated over both the payload and header and the other generated only on the header.

FLUTE uses the Universal Datagram Protocol (UDP) for transport over the network. UDP provides a check sum, such as a cyclic redundancy check (CRC), to enable detection of erroneous packets at the receiver. The CRC is generated over all bits of the FLUTE packet, including the payload and header. Thus, the CRC provided by UDP covers the FLUTE header. The FLUTE packets are sent from the media server 40 to each RAN 20 in the broadcast service area. At each RAN 20, the FLUTE packets are segmented and inserted into physical layer packets for delivery over the air interface to the mobile terminals 100. The FLUTE packets are referred to herein generically as application layer packets (ALPs). The physical layer packets are referred to herein as packet data units (PDUs). In other embodiments, there may be additional intermediate protocol layers between the application layer and physical layer. For example, in GSM/EDGE systems, the intermediate layers include the LLC and RLC layers.

Figure 5:
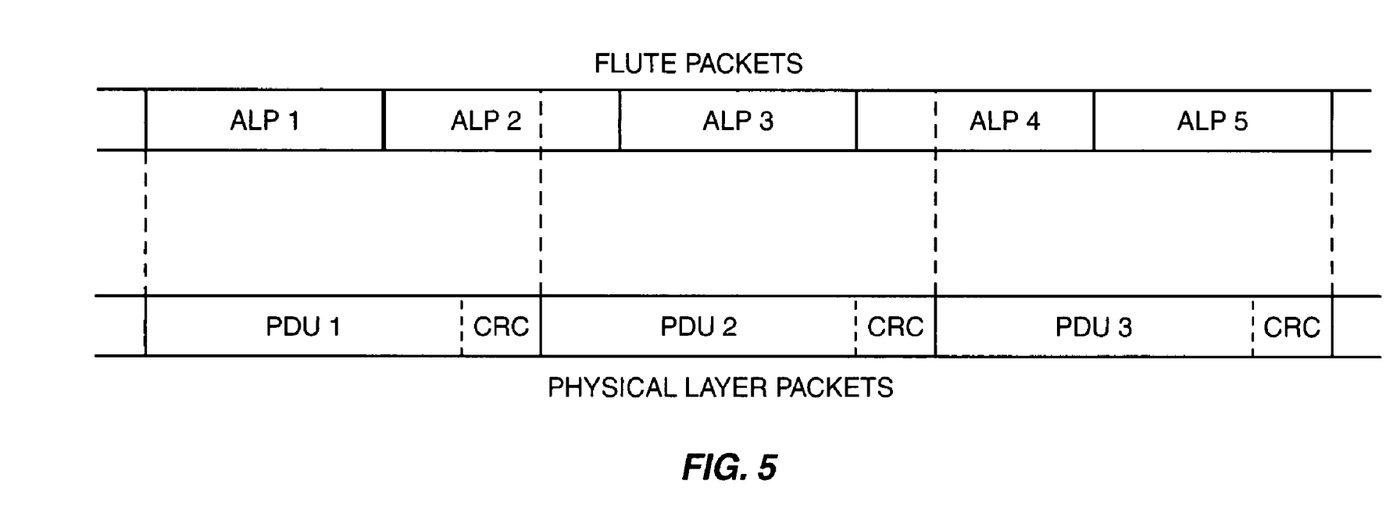
FIG. 5 illustrates an exemplary segmenting of application layer packets and formatting of physical layer packets for delivery to users over an air interface.

The encapsulation of ALPs in PDUs is illustrated in FIG. 5. The intermediate protocol layers are not shown in FIG. 5. As shown in FIG. 5, the PDUs are larger in size than the ALPs, so that each PDU contains data from more than one ALP. In FIG.

5, PDU 1 contains data from ALPs 1 and 2, PDU 2 contains data from ALPs 2 and 3, and PDU 3 contains data from ALPs 4 and 5. Each PDU includes a check sum, such as a CRC, to enable detection of errors that may occur during transmission over the air interface.

While FIG. 5 illustrates ALPs smaller than the PDUs, those skilled in the art will recognize that the ALP could be larger than the PDU. The selection of the ALP size is a key parameter for mobile broadcast services. Increasing ALP size reduces header overhead but will increase the packet loss rate for ALPs. Conversely, reducing ALP size will reduce the packet loss rate, but will increase header overhead.

Figure 6:
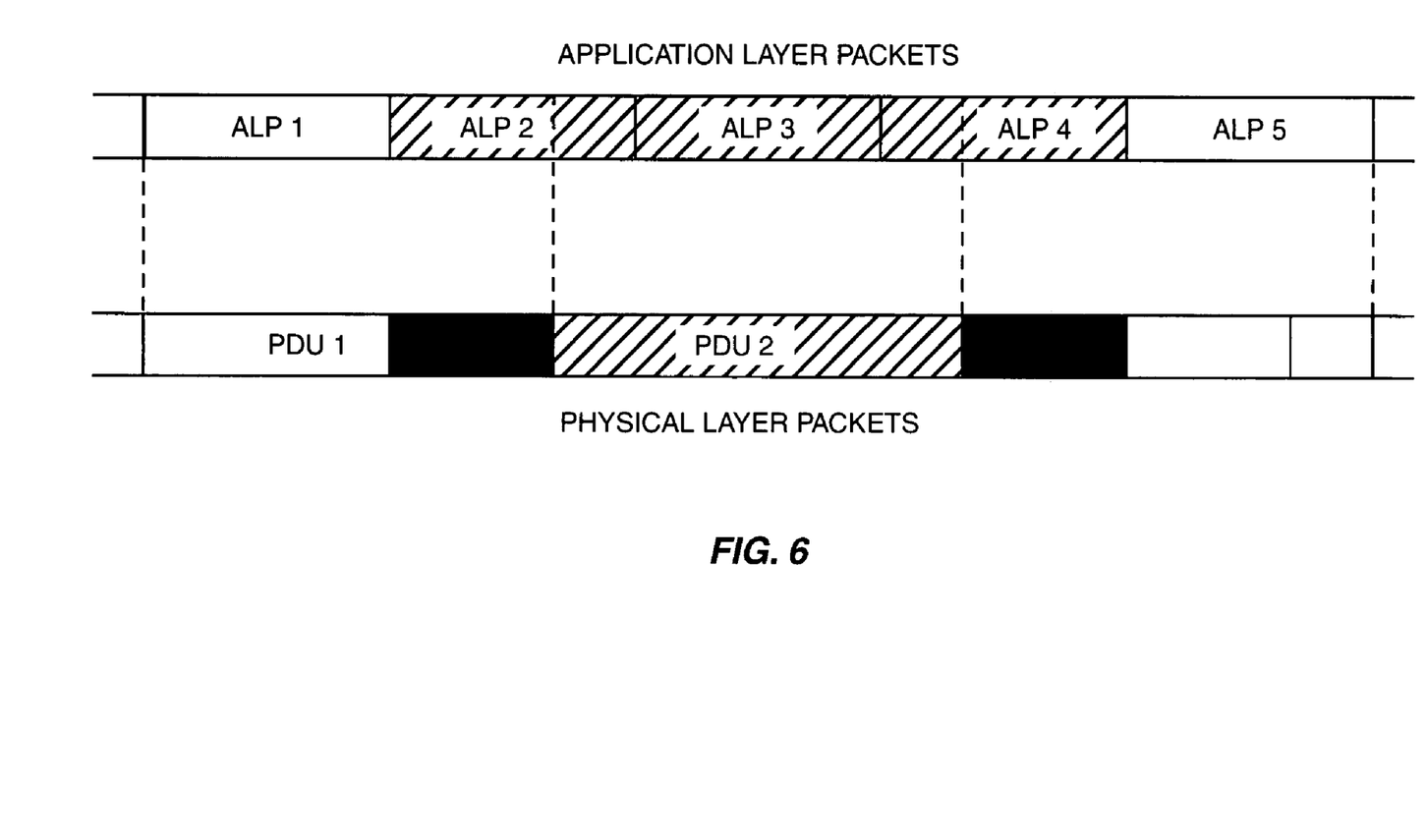
FIG. 6 illustrates how errors in physical layer packets propagate to application layer packets.

At the receiver, erasure decoding is typically used so that application layer packets are discarded if any portion of the application layer packet is lost. The erasure of incomplete application layer packets may result in loss of otherwise valid data. FIG. 6 illustrates how erasure decoding may result in loss of valid application data. In FIG. 6, three physical layer packets or PDUs are received at the receiver. The CRC of the second packet, labeled PDU 2, fails so the packet is erased. PDU 2 includes data from three application layer packets, ALP 2, ALP 3, and ALP 4. In this case, ALP 2 also contains data from PDU 1 believed to be valid based on the CRC for PDU 1, and ALP 4 contains data from PDU 3 believed to be valid. ALP 3 is entirely lost. The solid black portion of PDUs 1 and 3 represents valid data that is lost. In some cases, the FEC decoder at the application layer will be able to decode the received data despite the loss of some application layer packets. In other cases, the loss of application layer packets will overcome the error correcting capability of the FEC codes, thus resulting in a decoding failure and loss of an entire source block.

According to the present invention, partially received application layer packets may be passed to the application layer so that the data in all valid PDUs will be available to the FEC decoder at the application layer. In this application, the term "partial application layer packet" or "partial ALP" refers to an ALP that contains some valid and some invalid data as indicated by a lower layer CRC. The valid data in a partial ALP is referred to herein as "dimmed" data. The FEC decoder may initially determine whether the source block can be successfully decoded without resort to the "dimmed" data. If so, decoding is performed using only complete application layer packets. If the complete application layer packets are not sufficient to perform FEC decoding, the FEC decoder may make additional attempts at decoding using "dimmed" data. Each additional attempt at decoding may use a different set of dimmed data. By using dimmed data, the FEC decoder may successfully decode a source block that would otherwise be undecodable.

There may be some instances where partial application layer packets should not be forwarded to the application layer even though the partial packet may contain valid data. One such circumstance is where the header of the application layer packet is lost. If multiple applications are currently running, the header identifies to the mobile terminal the application to which the data pertains. Without the header, the mobile terminal 100 may not be able to identify the application to which the data belongs. In this case, the entire application layer packet may be erased to prevent data from being forwarded to the wrong application.

Figure 7:
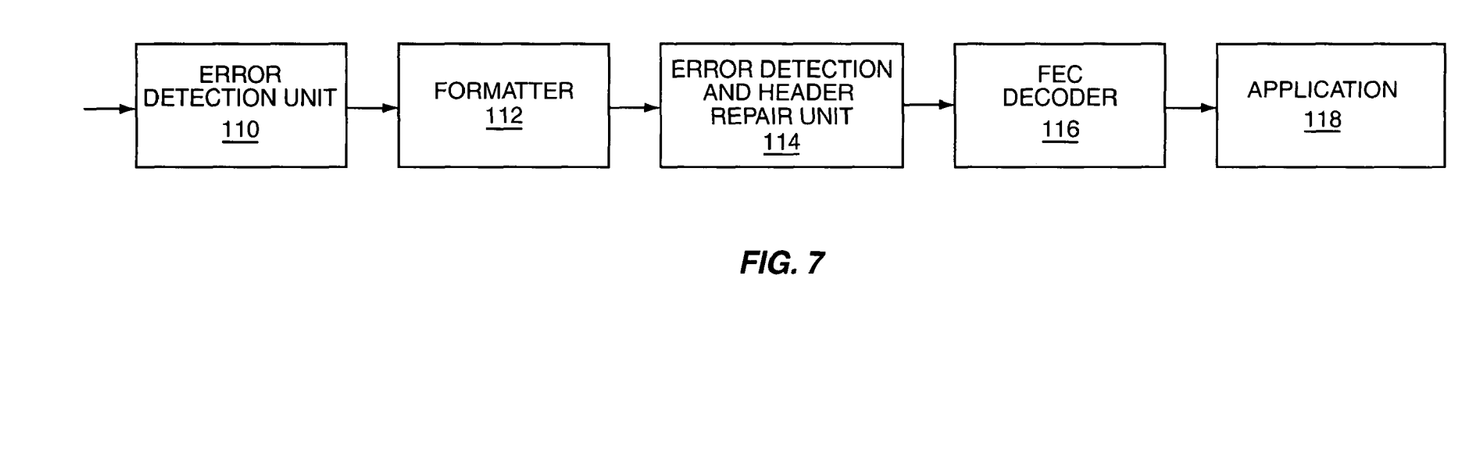
FIG. 7 is a block diagram illustrating functional entities within the mobile terminal.

FIG. 7 illustrates the functional entities in an exemplary mobile terminal 100 for processing broadcast service packets. Theses functional entities, which may be implemented in a programmable processor, include an error detection unit 110, a formatter 112, an error detection and header repair unit 114, and a FEC decoder 116. The error detection unit 110 is a physical layer (layer 1) function that performs erasure decoding of the received physical layer packets. The formatter 112 is an application layer or intermediate layer function that re-assembles the received packet data contained in the valid PDUs into application layer packets. The formatter 112 also is responsible for labeling data in partial application layer packets that are forwarded for decoding so that the decoder 116 can discriminate between invalid data and valid data in the same application layer packet. Labeling is based on error detection in a lower layer. In the exemplary embodiment, the labeling is based on the physical layer CRC. In other embodiments, the labeling could be based on the CRC in any one of the intermediate layers. The error detection and header repair unit 114 detects errors in the application layer packets that may have occurred during transmission through the network, and attempts to repair defective headers The decoder 116 performs FEC decoding to correct errors that may have occurred during transmission. In contrast to the prior art, the FEC decoder 116 can make use of the "valid" data contained in partial application layer packets. The application 118 receives the decoded data from the FEC decoder 116. The application 118 may, for example, comprise a video player or audio player for playing the received media content.

The formatter 112 may use a two-level or three-level labeling scheme to label data in application level packets forwarded to the FEC decoder 116. Those skilled in the art will appreciate that more than three levels could be used. One method of labeling the data in application layer packets is to assign a value to a reliability attribute for the data. Depending on the labeling scheme, the reliability attribute may have two or more possible values corresponding to different levels of reliability. In the two-level scheme, data is labeled as either "good" or "erased." In this scheme, "good" data is data indicated as valid by the physical layer CRC. "Erased" data is data indicated as invalid by the physical layer CRC. In the three-level scheme, data is labeled as either "good," "dimmed," or "erased." In this scheme, a distinction is made between "good" and "dimmed" data. "Good" data is data forming a complete application layer packet and that indicated as valid by the physical layer CRC. "Dimmed" data is data forming part of a partial application layer packet and that is indicated as valid by the physical layer CRC. In both schemes, the FEC decoder 116 can discriminate between valid and invalid data in a partial application layer packet. In the second scheme, the "dimmed" data may be treated as less reliable than the "good" data.

Figure 8:
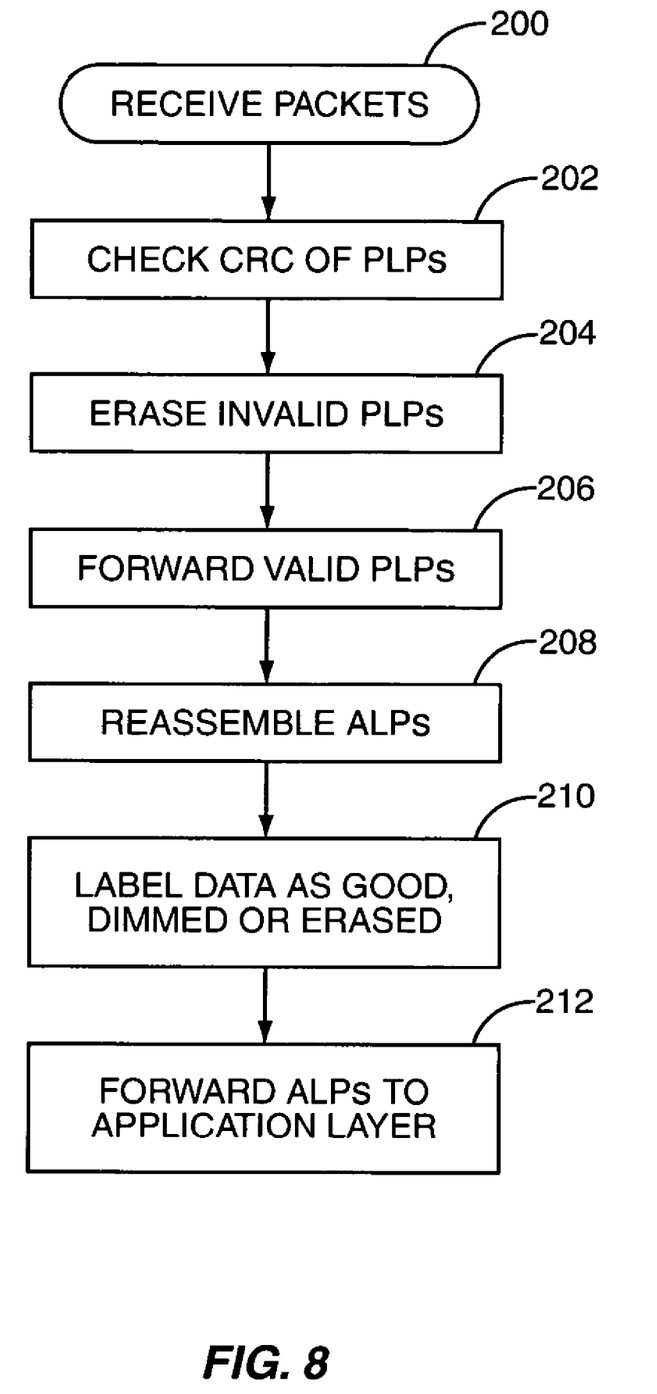
FIG. 8 is a flow chart illustrating erasure decoding for physical layer packets and reassembly of the physical layer packets into application layer packets.

FIG. 8 illustrates an exemplary procedure for re-assembling received data into application layer packets for delivery to the application layer. The procedure is executed when physical layer packets are received (block 200). The physical layer packets or PDUs are validated by the error detection unit 110 by checking the CRC contained in the physical layer packets after potential error decoding using a Turbo decoder (block 202). A physical layer packet is considered valid if the CRC is valid. The error detection unit erases invalid physical layer packets (block 204) and forwards the valid physical layer packets to a formatter (block 206). The formatter 112 re-assembles the data contained in the valid PDUs into application layer packets (block 208). Those skilled in the art will appreciate that the formatter 112 may reside in an intermediate protocol layer between the physical layer and the application layer, or in the application layer. For example, in some embodiments, in GSM/EDGE networks, the intermediate protocol layers may include the LLC layer and RLC layer. Thus, the formatting step may involve assembling physical layer packets into RLC and LLC packets, and then assembling the LLC packets into application layer packets. The formatter 112 also labels data in each application layer packet as either good, dimmed, or erased (block 210) by assigning a corresponding value to a reliability attribute for the data. Alternatively, the formatter 112 could simply label data as either "good" or "erased" without distinguishing "dimmed" data. As in conventional receivers, the formatter 112 forwards complete application layer packets to the application layer for decoding (block 212). Some application layer packets, however, may be lost entirely.

An error detection step based on the application layer packet CRC may be performed by the error detection and header repair unit 114 prior to FEC decoding the data contained in the application layer packets. However, application layer packets should not be automatically discarded if the application layer packet CRC fails. If the errors occur in the body of the application layer packet, there may still be a benefit in using the packet for decoding. Also, a failed CRC is to be expected in the case of partial application layer packets. However, there is a concern with routing packets to the correct application. An error in the header of the application layer packet may result in the packet being forwarded to the wrong application.

In one exemplary embodiment, the application layer packets with a valid CRC are forwarded to the FEC decoder 116. If the CRC is invalid, the header of the application layer packet is examined. If the header of the application layer packet is valid, or can be repaired, the application layer packet is forwarded to the FEC decoder 116. If the header is invalid and cannot be repaired, the application layer packet is erased.

Figure 9:
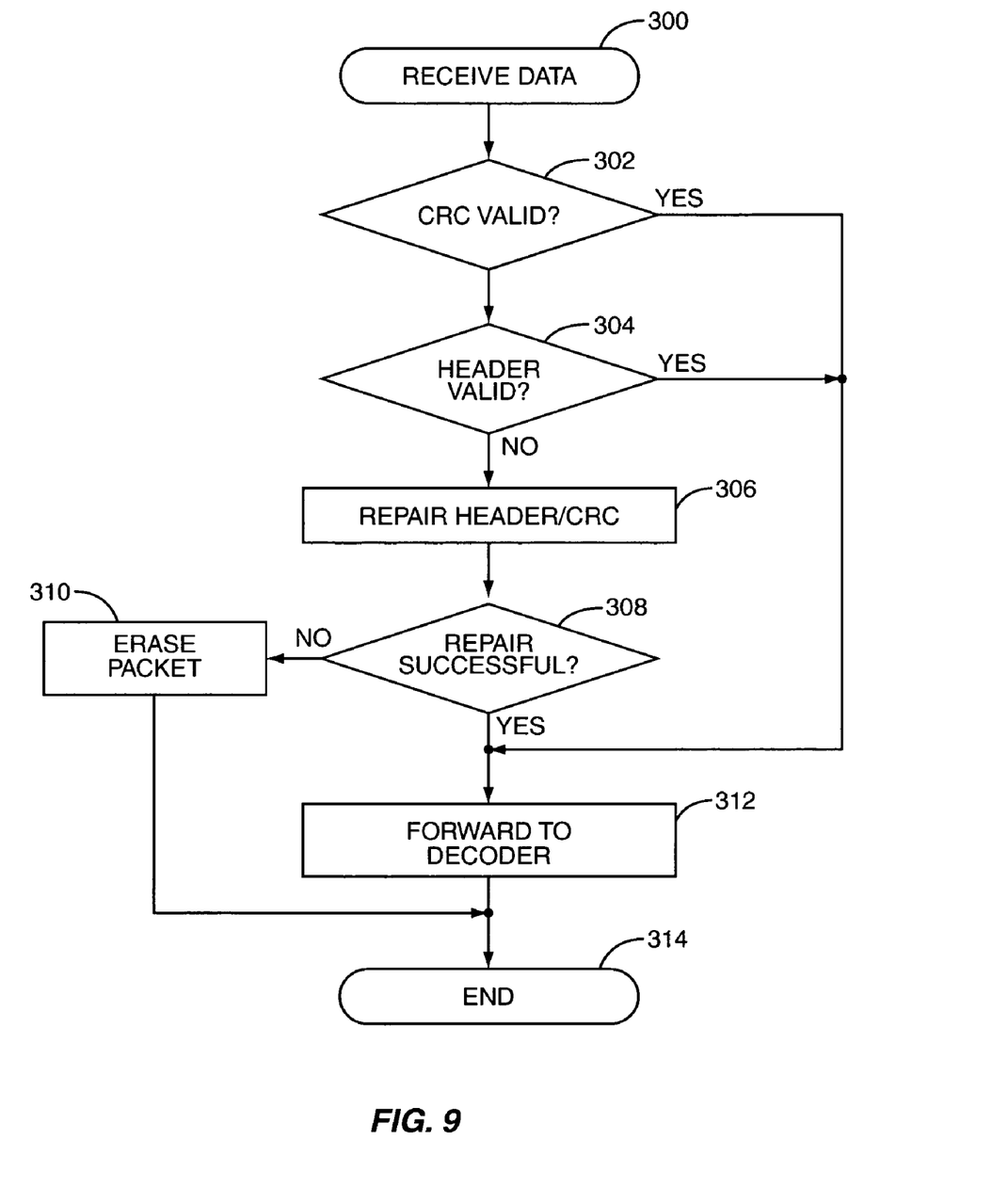
FIG. 9 is a flow chart illustrating an exemplary method of detecting and repairing errors in the header of application layer packets prior to decoding.

FIG. 9 illustrates the error detection step performed by the error detection and header repair unit 114 prior to FEC decoding in one exemplary embodiment. Data is received at the application layer from a lower layer (block 300) and a CRC check is performed (block 302). If the CRC check succeeds, the data is forwarded to the decoder 116 (block 312). If not, the header and CRC are examined (block 304) and any errors in the header or CRC are corrected (block 306). If the repair is successful (block 308), the ALP is forwarded to the FEC decoder 116 (block 312). ALPs with uncorrectable headers, including partial ALPs where the header is missing, are erased (block 310).

Detection of errors in the header may be performed by detecting unexpected values in specific header fields. Certain fields of the header may contain only a limited number of expected values. If one of the header fields contains an unexpected value, the error may be corrected by setting the presumably erroneous header field to each of the expected values and generating a CRC for each of the changed headers. In the case where the CRC is part of the dimmed data and one of the changed headers results in a CRC that matches the received CRC, it may be substituted for the received header. In the case where the CRC is part of the invalid data, the error detection and repair unit 114 may attempt to repair the header without performing CRC verification. For example, if there is only one active application and the adjacent packets are received without error, the receiver may infer the correct order and destination of the packet.

Figure 10:
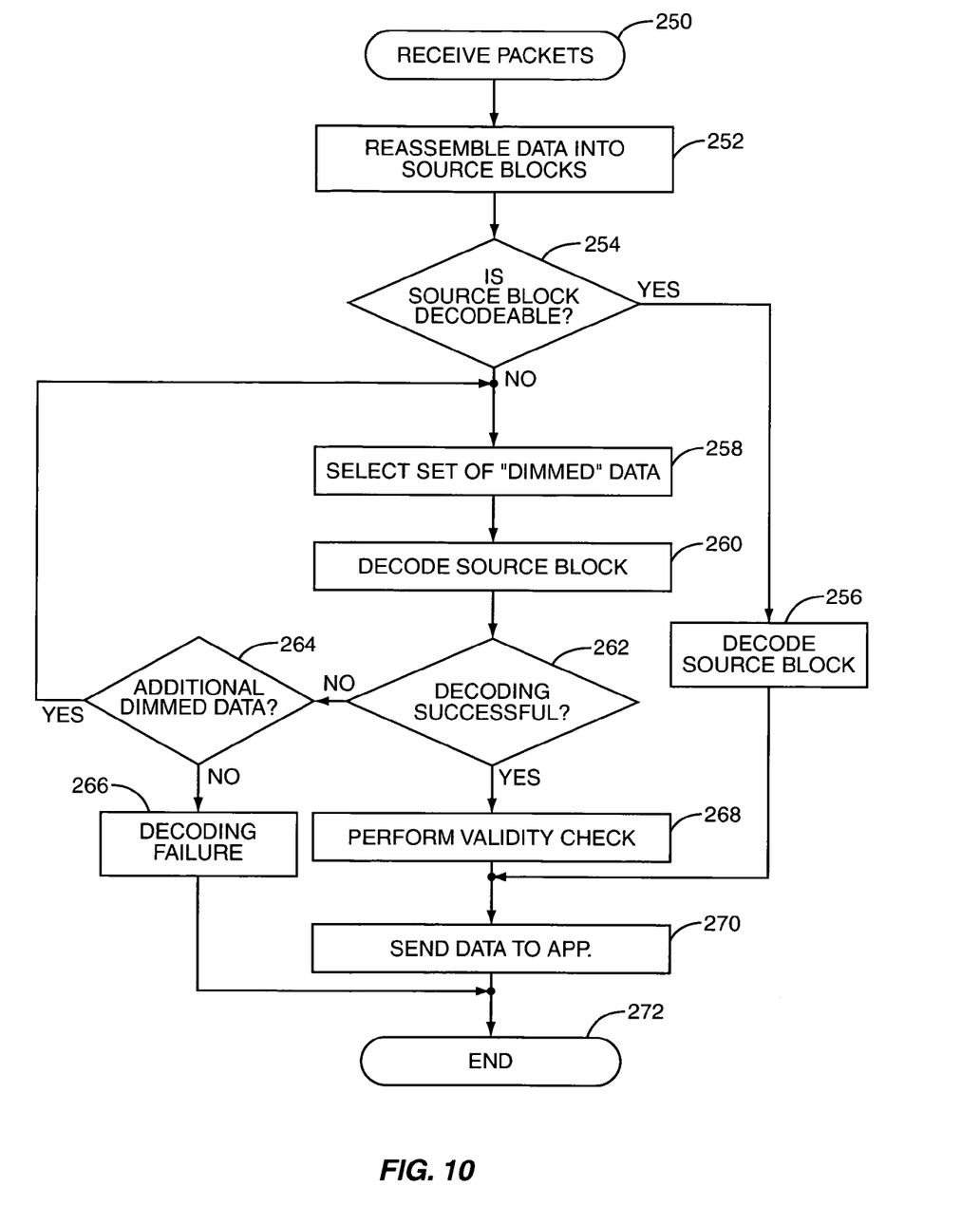
FIG. 10 illustrates a method of decoding application layer packets.

FIG. 10 illustrates an exemplary operation of the FEC decoder 116 in the application layer. After receiving the reassembled application layer packets (block 250), the decoder 116 performs error detection based on the application layer CRC (block 251)(FIG. 10), re-assembles the application layer packets into source blocks (block 252), and performs FEC decoding on each re-assembled source block (block 254-268). When the three-level labeling scheme is used to label data, the decoder 116 initially determines if the source block is decodable considering only valid data (block 254). If the source block is decodable using only "good" data, the source block is decoded normally without considering the "dimmed" data (block 256). If the source block is not decodable using only "good" data, the FEC decoder 116 may make one or more attempts to decode the source block using "dimmed" data to supplement the "good" data during the decoding process. In one embodiment, the FEC decoder 116 may select a subset of the "dimmed" data to use in the decoding process (block 258). The FEC decoder 116 decodes the source block using the "dimmed" data to supplement the "good" data (block 260). If the decoding process fails (block 262), additional attempts at decoding the source block may be made using a different subsets of the "dimmed" data. The subset of the "dimmed" data selected on each subsequent attempt may include only previously-unused "dimmed" data, or may use a combination of previously-used "dimmed" data and previously-unused "dimmed" data. After each unsuccessful decoding attempt, the FEC decoder 116 determines if it has additional "dimmed" data (block 264). The FEC decoder 116 may continue this iterative decoding process until all of the "dimmed" data is exhausted, or until the decoding is successful. In some embodiments, the number of decoding attempts may be limited to a predetermined maximum number.

If the source block is successfully decoded, the FEC decoder 116 may then perform a validity check (block 268). For example, the FEC decoder 116 may perform a CRC check on one or more rows of the source block where the CRC was labeled as "dimmed." If the "dimmed" CRC is valid after decoding, the entire source block may be considered valid. In other embodiments, the FEC decoder 116 may use a portion of the "dimmed" data not used in the decoding process to perform the post-process validity check. There may residual error detection capability left in the outer code. If the validity check fails or if the "dimmed" data is exhausted without successfully decoding the source block, a decoding failure is indicated (block 266). If decoding is successful, the decoded data is sent to the application 118 (block 270) and the procedure ends (block 272).

Making the "dimmed" data contained in partial application layer packets available to the FEC decoder 116 mitigates the error propagation effect so that packet length of application packets can be increased without significantly impacting the error rate. Increasing the packet length of the application layer packets, in turn, increases channel capacity because the relative size of the header is significantly reduced.

The present invention may, of course, be carried out in other specific ways than those herein set forth without departing from the scope and essential characteristics of the invention. The present embodiments are, therefore, to be considered in all respects as illustrative and not restrictive, and all changes coming within the meaning and equivalency range of the appended claims are intended to be embraced therein.

What is claimed is:

1. A method of re-assembling higher layer packets received by a mobile station and containing coded packet data protected by a forward error correction code, said method comprising:
re-assembling a higher layer packet from data in two or more lower layer packets received from a network over an air interface;
detecting errors in said lower layer packets;
labeling said data in said higher layer packet based on detected errors in said lower layer packets by assigning a first reliability value to a first segment of said higher layer packet containing invalid data and assigning a second reliability value to a second segment of said higher layer packet containing valid data.

2. The method of claim 1 wherein said first reliability value indicates invalid data, and wherein said second reliability value indicates valid data.

3. The method of claim 1 wherein said first reliability value indicates invalid data, and wherein said second reliability value indicates dimmed data.

4. The method of claim 3 further comprising
re-assembling another higher layer packet from data in two or more other lower layer packets received from the network over the air interface;
detecting no error in any of said other lower layer packets; and
assigning a third reliability value to said data in said another higher layer packet.

5. The method of claim 4 wherein said third reliability value indicates valid data.

6. The method of claim 1 further comprising decoding the coded packet data contained in said higher layer packet using valid data in said higher layer packet.

7. The method of claim 1 wherein said higher layer packet includes a header not protected by said forward error correction code, and further comprising detecting errors in said header.

8. The method of claim 7 wherein detecting errors in said header comprises detecting unexpected values in one or more header fields.

9. The method of claim 8 further comprising repairing headers with detected errors.

10. The method of claim 9 further comprising verifying the repaired headers.

11. The method of claim 10 wherein verifying the repaired headers includes using a CRC generated on said header to verify the repaired headers.

12. The method of claim 1 further comprising re-assembling said higher layer packet into a source block.

13. A mobile station comprising:
a receiver to receive coded packet data encapsulated in lower layer packets from a mobile network over an air interface;
an error detection unit to detect errors in lower layer packets;
an assembler to assemble a higher layer packet from data in two or more lower layer packets and to label said data in said higher layer packet based on errors detected in said two or more lower layer packets by said error detection unit, wherein said labeling comprises assigning a first reliability value to a first segment of said higher layer packet containing invalid data and assigning a second reliability value to a second segment of said higher layer packet containing valid data.

14. The mobile station of claim 13 wherein said first reliability value indicates invalid data, and wherein said second reliability value indicates valid data.

15. The mobile station of claim 13 wherein said first reliability value indicates invalid data, and wherein said second reliability value indicates dimmed data.

16. The mobile station of claim 15 wherein said assembler assembles another higher layer packet from data in two or more other lower layer packets, wherein said error detection unit detects no error in any of said other lower layer packets, and wherein said assembler further assigns a third reliability value to said data in said another higher layer packet.

17. The mobile station of claim 16 wherein said third reliability value indicates valid data.

18. The mobile station of claim 13 further comprising a decoder to decode the coded packet data contained in said higher layer packet using valid data in said higher layer packet.

19. The mobile station of claim 13 further comprising an error detection and header repair unit to detect errors in said header of said higher layer packet.

20. The mobile station of claim 19 wherein said error detection and header repair unit detects errors in said header by detecting unexpected values in one or more header fields.

21. The mobile station of claim 20 wherein the error detection and header repair unit repairs headers with detected errors.

22. The mobile station of claim 21 wherein the error detection and header repair unit verifies the repaired headers using a CRC generated on said headers.

23. The mobile station of claim 13 further comprising a decoder to re-assemble said higher layer packet into a source block.

* * * * *